(12) United States Patent
Allen, Jr.

(10) Patent No.: US 12,159,320 B1
(45) Date of Patent: Dec. 3, 2024

(54) SYSTEMS FOR OPTIMIZING BATTERY CHARGING AND DISCHARGING

(71) Applicant: Hunt Energy Network, L.L.C., Dallas, TX (US)

(72) Inventor: John Franklin Allen, Jr., Dallas, TX (US)

(73) Assignee: Hunt Energy Network, L.L.C., Dallas, TX (US)

( * ) Notice: Subject to any disclaimer, the term of this patent is extended or adjusted under 35 U.S.C. 154(b) by 0 days.

(21) Appl. No.: 17/206,850

(22) Filed: Mar. 19, 2021

Related U.S. Application Data (60) Provisional application No. 62/992,640, filed on Mar. 20, 2020.

(51) Int. Cl.
*G06Q 50/06* (2024.01)
*G06Q 30/0283* (2023.01)

(52) U.S. Cl.
CPC ......... *G06Q 50/06* (2013.01); *G06Q 30/0283* (2013.01)

(58) Field of Classification Search
None
See application file for complete search history.

(56) References Cited

U.S. PATENT DOCUMENTS

| | | | | |
|---|---|---|---|---|
| 10,580,094 | B1 * | 3/2020 | Haynold | G06Q 50/06 |
| 11,055,732 | B2 * | 7/2021 | Sun | H02J 3/466 |
| 2013/0030784 | A1 * | 1/2013 | Viassolo | G06Q 10/00 |
| | | | | 703/18 |

(Continued)

FOREIGN PATENT DOCUMENTS

KR  20120137598 A  * 12/2012  ............. G06Q 50/06

OTHER PUBLICATIONS

Gundogdu et al.; "Battery SOC Management Strategy for Enhanced Frequency Response and Day-Ahead Energy Scheduling of BESS for Energy Arbitrage"; Dec. 18, 2017; IEEE; pp. 7635-7640 (Year: 2017).*

*Primary Examiner* — Omar Zeroual
*Assistant Examiner* — Jorge G Del Toro-Ortega
(74) *Attorney, Agent, or Firm* — Baker Botts L.L.P.

(57) ABSTRACT

A method includes accessing historic five-minute electricity data for a predetermined number of previous days, determining, using the historic five-minute electricity data for the predetermined number of previous days, a maximum charge price for the predetermined number of previous days, and determining, using the historic five-minute electricity data for the predetermined number of previous days, a minimum discharge price for the predetermined number of previous days. The method further includes determining a current amount of charge of a battery, accessing live five-minute electricity data for a current day, and communicating one or more instructions to discharge a battery when a next live five-minute electricity price is greater than the determined minimum discharge price and the current amount of charge of the battery is greater than zero. The method further includes communicating one or more instructions to charge the battery when the next live five-minute electricity price is less than the determined maximum charge price and the current amount of charge of the battery is greater than a maximum charge amount of the battery.

19 Claims, 7 Drawing Sheets

(56) References Cited

U.S. PATENT DOCUMENTS

2014/0039710 A1* 2/2014 Carter .................. G05B 13/041
  700/291
2014/0279361 A1* 9/2014 Streeter ................ G06Q 40/04
  705/37
2016/0241042 A1* 8/2016 Mammoli ............... H02J 3/381

* cited by examiner

SYSTEMS FOR OPTIMIZING BATTERY CHARGING AND DISCHARGING

CROSS-REFERENCE TO RELATED APPLICATIONS

The present application claims the benefit of U.S. Provisional Application 62/992,640 filed Mar. 20, 2020, the contents of which is incorporated in its entirety herein.

TECHNICAL FIELD

This disclosure generally relates to batteries, and more particularly to systems for optimizing battery charging and discharging.

BACKGROUND

Energy storage devices such as batteries are used by various individuals, businesses, and organizations to store power from the electric grid or other power sources (e.g., wind or solar power plants). The stored power may then be used to provide needed electrical power. As one example, an individual may install a battery in their home that stores power from the electric grid and discharges the stored power for use in their home or electric vehicle. As another example, a business may install a large backup battery that stores power in case of a power outage. In these and other examples, the unused power stored in a battery may be discharged and sold back to the electric grid.

SUMMARY OF PARTICULAR EMBODIMENTS

In some embodiments, a system includes one or more processors and one or more computer-readable non-transitory storage media coupled to one or more of the processors. The one or more computer-readable non-transitory storage media comprises instructions operable when executed by one or more of the processors to cause the system to access historic five-minute electricity data for a predetermined number of previous days, determine, using the historic five-minute electricity data for the predetermined number of previous days, a maximum charge price for the predetermined number of previous days, and determine, using the historic five-minute electricity data for the predetermined number of previous days, a minimum discharge price for the predetermined number of previous days. The instructions are further operable when executed by one or more of the processors to cause the system to determine a current amount of charge of a battery, access live five-minute electricity data for a current day, communicate one or more instructions to discharge a battery when a next live five-minute electricity price is greater than the determined minimum discharge price and the current amount of charge of the battery is greater than zero, and communicate one or more instructions to charge the battery when the next live five-minute electricity price is less than the determined maximum charge price and the current amount of charge of the battery is greater than a maximum charge amount of the battery.

In one embodiment, a method includes accessing historic five-minute electricity data for a predetermined number of previous days, determining, using the historic five-minute electricity data for the predetermined number of previous days, a maximum charge price for the predetermined number of previous days, and determining, using the historic five-minute electricity data for the predetermined number of previous days, a minimum discharge price for the predetermined number of previous days. The method further includes determining a current amount of charge of a battery, accessing live five-minute electricity data for a current day, and communicating one or more instructions to discharge a battery when a next live five-minute electricity price is greater than the determined minimum discharge price and the current amount of charge of the battery is greater than zero. The method further includes communicating one or more instructions to charge the battery when the next live five-minute electricity price is less than the determined maximum charge price and the current amount of charge of the battery is greater than a maximum charge amount of the battery.

In some embodiments, one or more computer-readable non-transitory storage media includes software that is operable when executed to access historic five-minute electricity data for a predetermined number of previous days, determine, using the historic five-minute electricity data for the predetermined number of previous days, a maximum charge price for the predetermined number of previous days, and determine, using the historic five-minute electricity data for the predetermined number of previous days, a minimum discharge price for the predetermined number of previous days. The software is further operable when executed to determine a current amount of charge of a battery, access live five-minute electricity data for a current day, communicate one or more instructions to discharge a battery when a next live five-minute electricity price is greater than the determined minimum discharge price and the current amount of charge of the battery is greater than zero, and communicate one or more instructions to charge the battery when the next live five-minute electricity price is less than the determined maximum charge price and the current amount of charge of the battery is greater than a maximum charge amount of the battery.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a more complete understanding of the particular embodiments, and the advantages thereof, reference is now made to the following written description taken in conjunction with the accompanying drawings, in which.

DESCRIPTION OF EXAMPLE EMBODIMENTS

Energy storage devices such as batteries are used by various individuals, businesses, and organizations to store power from the electric grid or other power sources (e.g., wind or solar power plants). The stored power may then be used to provide needed electrical power. As one example, an individual may install a battery in their home that stores power from the electric grid and discharges the stored power for use in their home or electric vehicle. As another example, a business may install a large backup battery that stores power in case of a power outage. In these and other examples, the unused power stored in a battery may be discharged and sold back to the electric grid. However, determining optimal times to charge and discharge a battery to the grid throughout a day is typically not known or addressed.

To address these and other problems with existing systems, the embodiments of the disclosure provide systems and methods for optimizing battery charging and discharging to an electric grid. More specifically, some embodiments of the disclosure determine optimal times throughout a day to discharge stored electrical power in a battery to an electric grid. Similarly, some embodiments of the disclosure determine optimal times throughout a day to charge a battery using electrical power from an electric grid.

Figure 1:
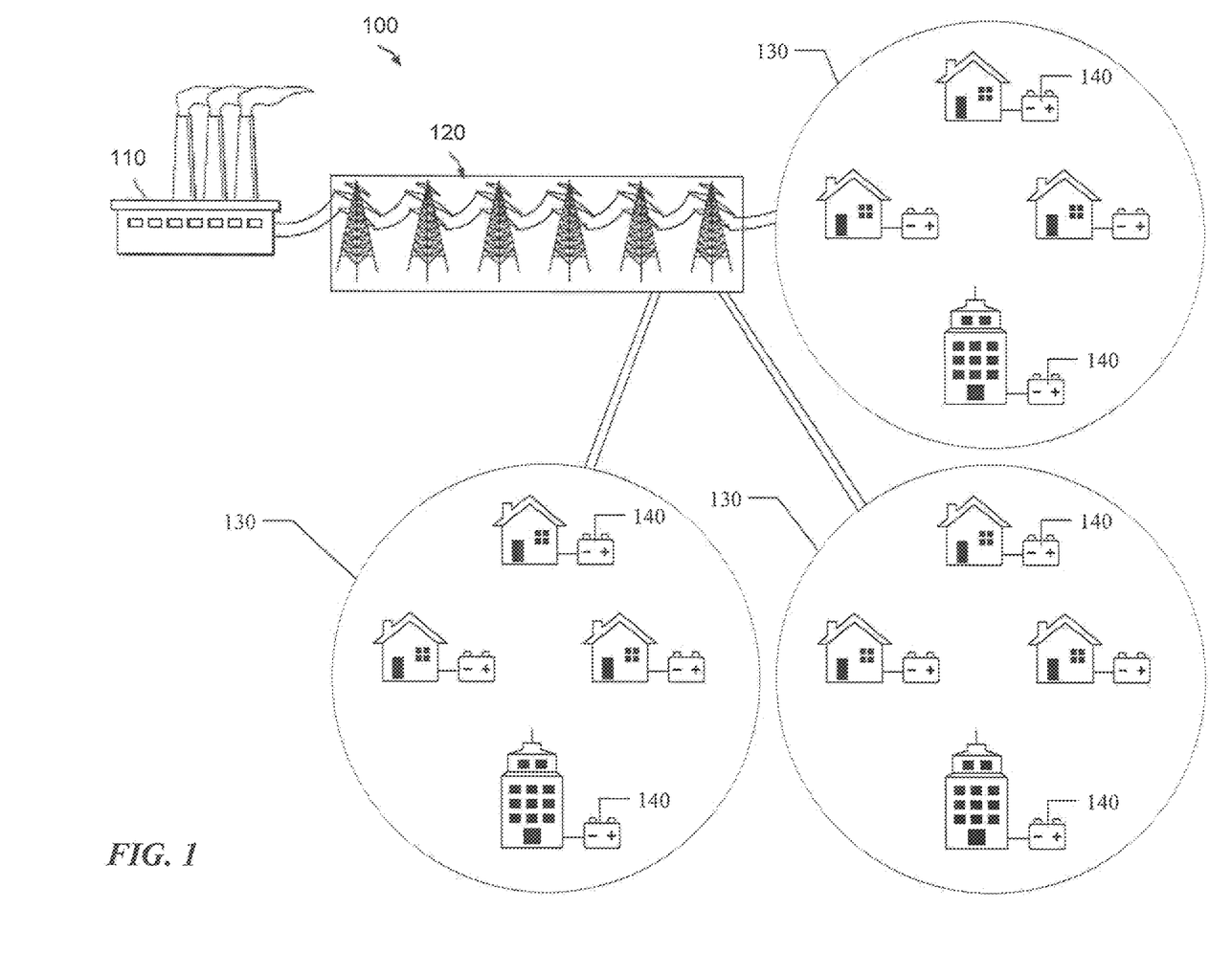
FIG. 1 illustrates an example power generation and distribution system, according to some embodiments.

FIG. 1 is a block diagram illustrating an example power generation and distribution system 100, according to certain embodiments. Power generation and distribution system 100 includes power generation unit 110, electric grid 120, and nodes 130. Power generation unit 100 generates megawatts of power for transmission over electric grid 120 for use at nodes 130. Each node 130 includes residential and commercial structures that may each include a battery 140. Battery 140 may store electrical power from electric grid 120 (or from other power generation sources such as solar/wind power sources) and may discharge stored power back to electric grid 120. In some embodiments, battery 140 may be a stand-alone battery that is not associated with any residential or commercial structure.

In general, a battery such as battery 140 has the payoff structure of a physical call option. In some electric grids 120 (e.g., the Texas Interconnection electric grid operated by Electric Reliability Council of Texas (ERCOT)), electricity is priced in five-minute segments in a continuous, 24 hour/ 365 day market. Battery 140 can be discharged multiple times per day, following the 5-minute nodal price signals of electric grid 120. For example, a battery 140 with a one megawatt (MW) capacity can be discharged over twelve five-minute joint or disjoint periods. TABLE 1 below illustrates example five-minute nodal pricing for a particular node 130 for a two-hour window of a particular day.

TABLE 1

| TIME | PRICE/MWh |
|------|-----------|
| 6:00:00 | $1207.95 |
| 6:05:00 | $1208.28 |
| 6:10:00 | $1208.30 |
| 6:15:00 | $1208.33 |
| 6:20:00 | $1208.63 |
| 6:25:00 | $1208.74 |
| 6:30:00 | $1208.73 |
| 6:35:00 | $1208.80 |
| 6:40:00 | $21.40 |
| 6:45:00 | $21.38 |
| 6:50:00 | $21.21 |
| 6:55:00 | $1208.46 |
| 7:00:00 | $1208.65 |
| 7:05:00 | $1208.79 |
| 7:10:00 | $1208.68 |
| 7:15:00 | $1208.77 |
| 7:20:00 | $1208.71 |
| 7:25:00 | $1208.81 |
| 7:30:00 | $1208.69 |
| 7:35:00 | $21.29 |
| 7:40:00 | $21.48 |
| 7:45:00 | $21.34 |
| 7:50:00 | $21.40 |
| 7:55:00 | $21.42 |
| 8:00:00 | $21.30 |

Unlike traditional financial options, whose strike prices are set at purchase, a daily strike price of battery 140 (e.g., the fixed price at which power of battery 140 is sold or bought) can be set at the discretion of its owner or operator. Leaving aside physical parameters such as the battery degradation cost per charging cycle, the challenge for the owner or operator is to set a daily discharge strike price for battery 140 which maximizes the battery's opportunity to capture the day's highest 5-minute nodal prices, up to the limit of the physical capacity of battery 140. Similarly, the challenge for the owner or operator of battery 140 is to set a daily charging strike price for battery 140 which maximizes the battery's opportunity to capture the day's lowest 5-minute nodal prices, up to the limit of the physical capacity of battery 140. For discharging battery 140, the discharge strike price of battery 140 cannot be so high that a discharge algorithm only looks for the highest prices and cannot be so low that battery 140 discharges before the appearance of extreme prices.

The highly volatile and random nature of five-minute nodal prices is problematic for statistical/machine learning predictive methods. Weather and its effect on renewable generation, generation outages, and transmission constraints are all reflected in the five-minute market. Price prediction reduces to weather and constraint prediction, without an increase in tractability. Predicting optimal battery dispatch times and prices is therefore of limited use.

Figure 2:
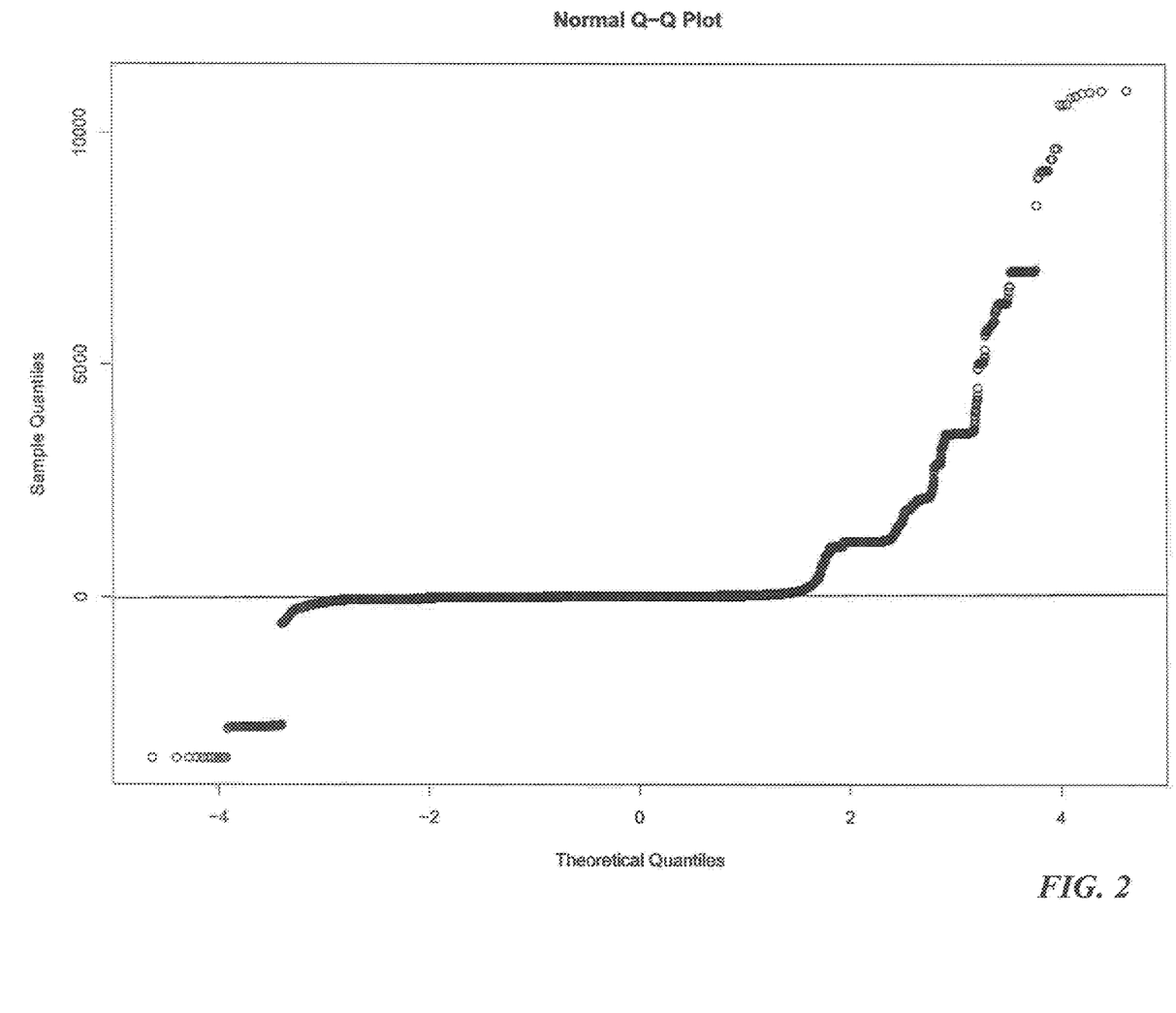
FIG. 2 illustrates a quantile-quantile plot of electricity prices, according to some embodiments.

The highly volatile and skewed nature of nodal five-minute prices is shown in the quantile-quantile plot of FIG. 2, which plots quantiles from a normal distribution vs. quantiles of actual prices. Normally distributed data points would fall on the line. As illustrated in this figure, nodal power data is highly skewed to the upside.

Figure 3:
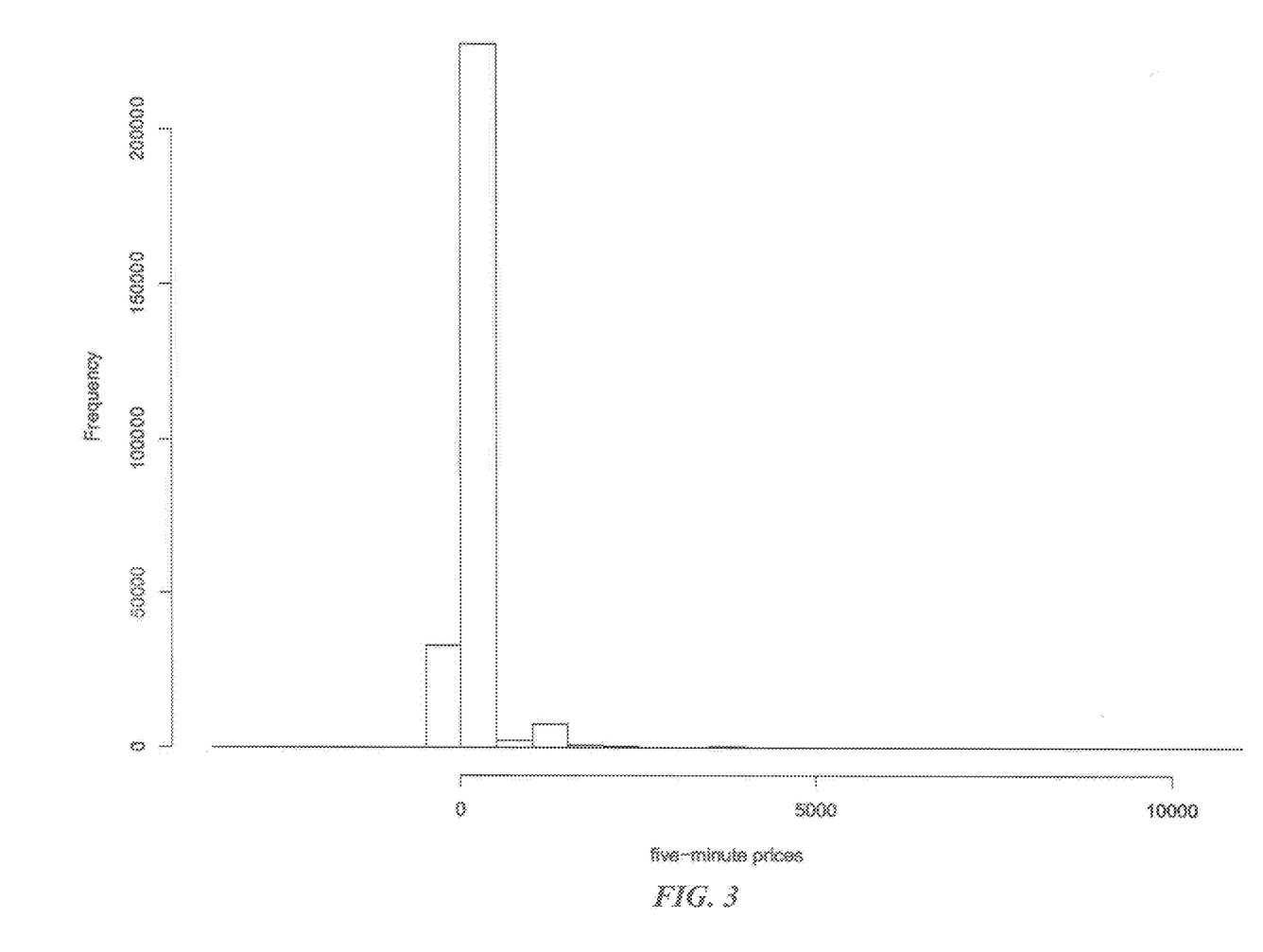
FIG. 3 illustrates a histogram of five-minute electricity prices for a particular node of FIG. 1, according to some embodiments.

The histogram illustrated in FIG. 3 also gives insight into the problem. Predictive methods are more likely to capture the mass of the distribution around zero. Battery sale price optimization, however, requires the capture of the majority of rare but extreme prices, out to $10,000/MW, for example.

Figure 4:
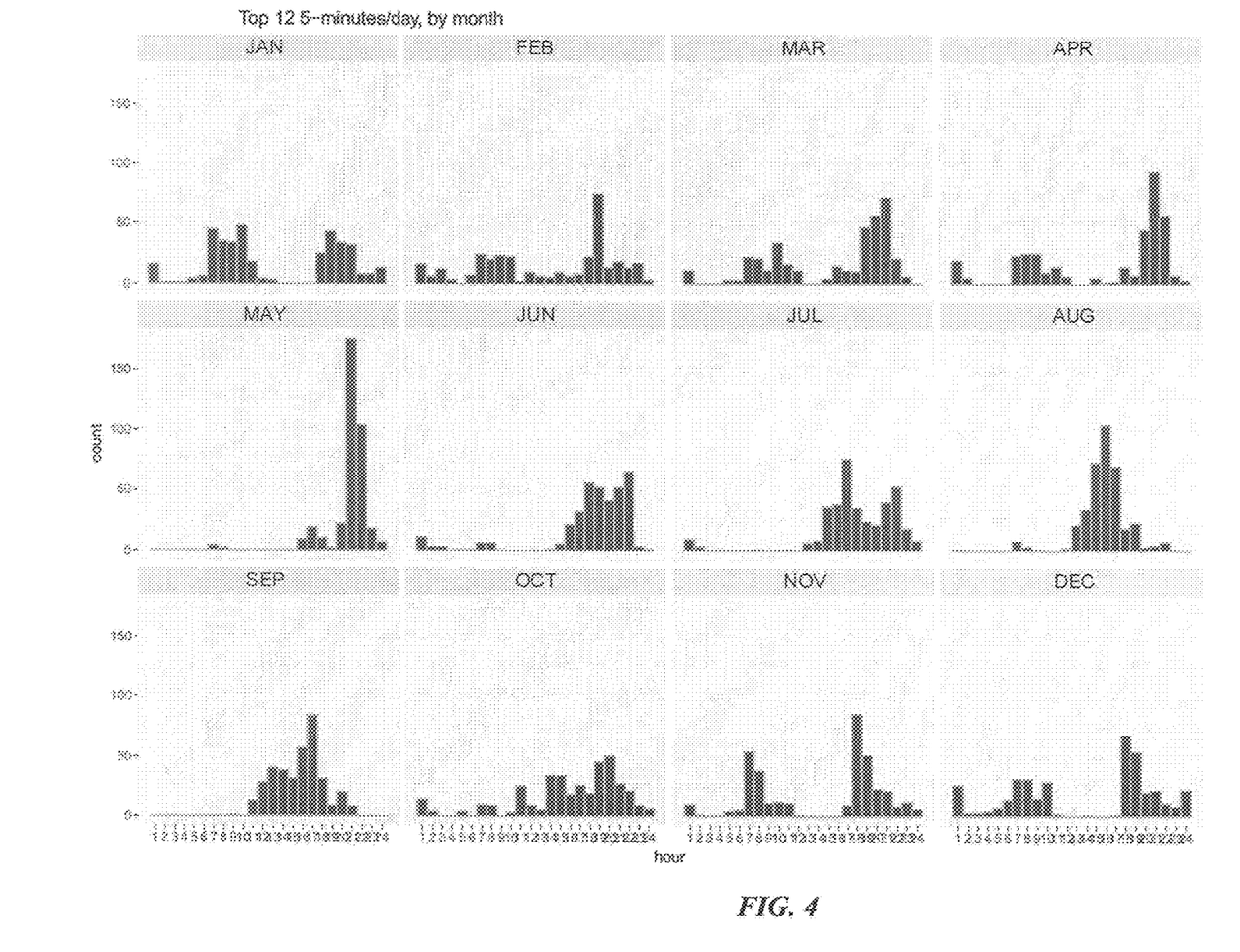
FIG. 4 illustrates monthly five-minute electricity price histograms for a particular node of FIG. 1, according to some embodiments.

Despite the volatile and unpredictable nature of five-minute nodal power prices, some patterns do emerge. For example, FIG. 4 illustrates monthly price histograms for a particular node 130. This figure illustrates how the daily distribution of the highest twelve five-minute nodal prices of the particular node 130 follows a seasonal pattern. As illustrated in this figure, shoulder and winter months generally follow bi-modal distributions with high prices in both the morning and evening. On the contrary, May through September high prices are concentrated in the afternoon.

Figure 5:
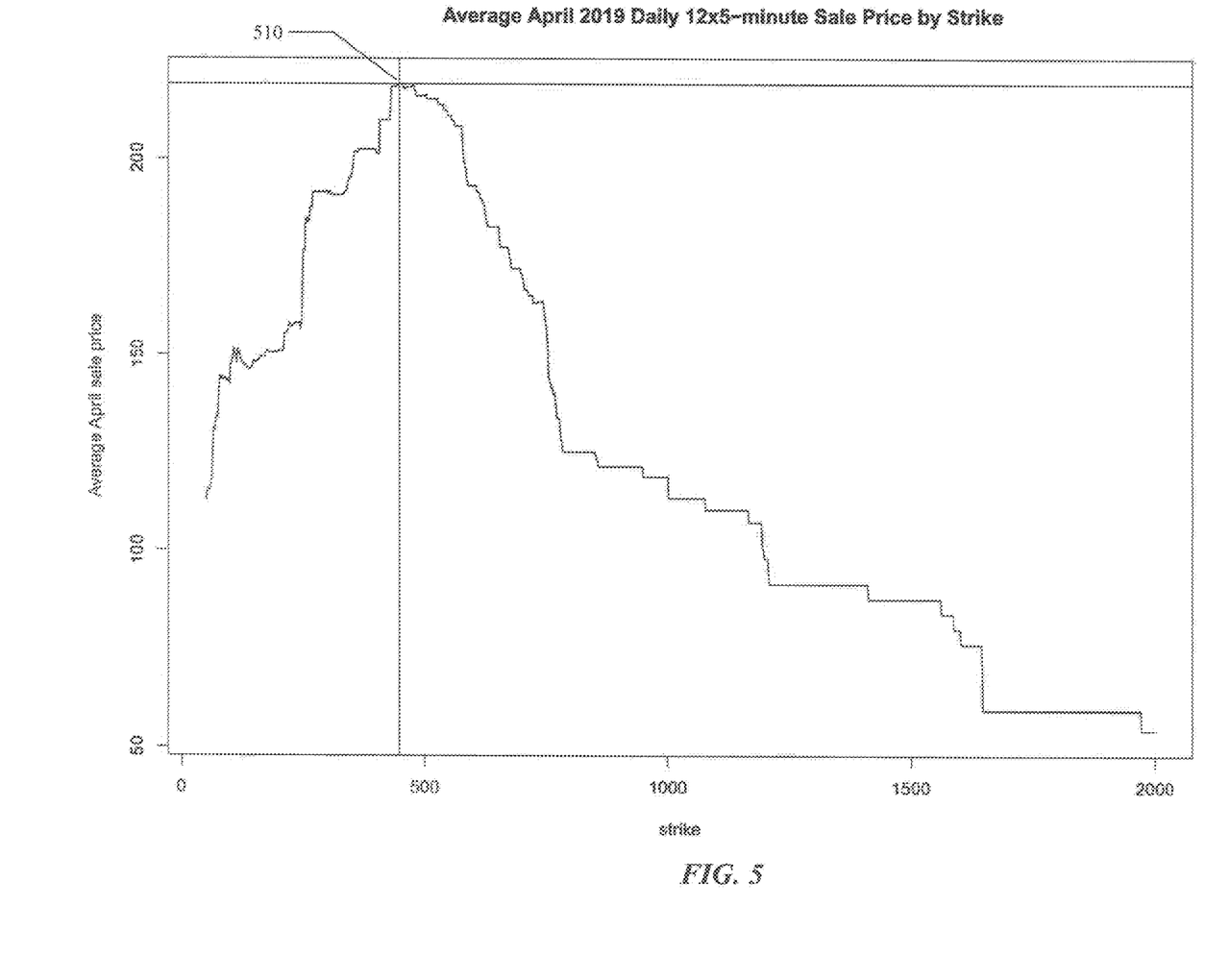
FIG. 5 illustrates a graphical representation of an optimal strike price for a battery, according to some embodiments.

To address the problems and limitations of typical predictive methods, and to address the desire of charging and discharging battery 140 at a majority of optimal prices of node 130, certain embodiments of the disclosure provide strike price optimization for battery 140 using a model that learns and adjusts to seasonality through recent prices (e.g., charge and discharge price combinations of the previous N days). A graphical representation of the optimal strike price 510 for battery 140 is illustrated in FIG. 5, which illustrates how the optimal strike 510 over any particular time period for a particular node 130 is the highest y-axis/lowest x-axis combination on a graph of the average price of the first twelve five-minute daily sales. In some embodiments, battery 140 is controlled to charge and discharge based on a comparison of live five-minute pricing data with a matrix of maximum charge and minimum discharge price combinations for the previous N days. A particular embodiment that optimizes battery 140 using such an algorithm is illustrated below in reference to FIG. 6.

Figure 6:
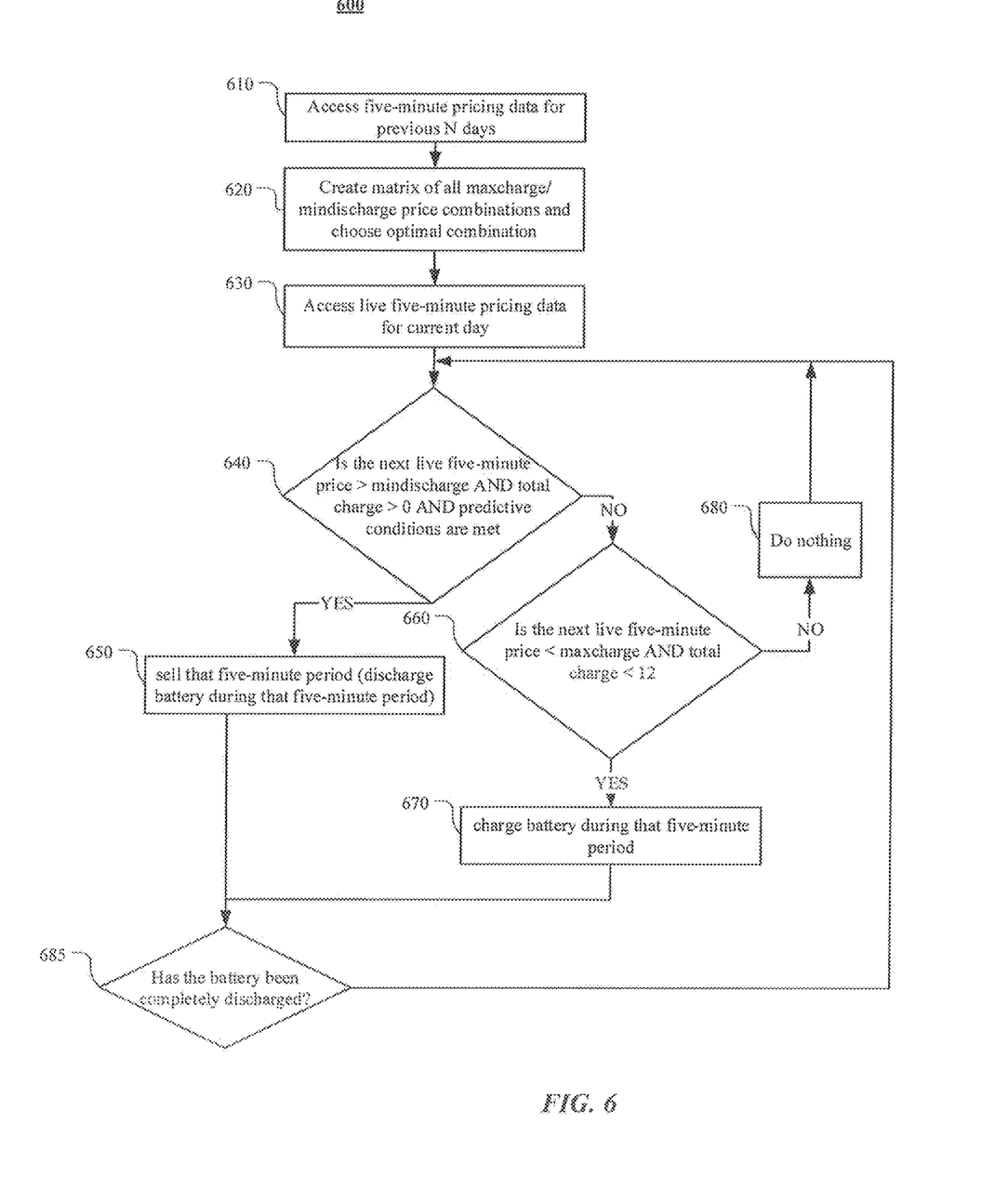
FIG. 6 illustrates a method for determining an optimal price to charge/discharge a battery based on a comparison of live five-minute pricing data with a matrix of maximum charge and minimum discharge price combinations for the previous N days, according to some embodiments.

FIG. 6 illustrates an example method 600 for determining optimal price (e.g., price 510) to charge/discharge battery 140 based on a comparison of live five-minute pricing data with a matrix of maximum charge and minimum discharge price combinations for the previous N days. In this example embodiment and throughout this disclosure, the set number of five-minute periods is twelve, which corresponds to a 1 MW battery (i.e., a 1 MW battery will be completely discharged over twelve five-minute periods). However, any other set number of five-minute periods may be used (e.g., 24 five-minute periods per day for a 2 MW battery 140, 48 five-minute periods per day for a 4 MW battery, etc.)

At step 610, method 600 accesses historical five-minute pricing data for the previous N days. For example, method 600 may access five-minute pricing data for the previous three days. N may be any appropriate integer number of previous days. In some embodiments, the five-minute pricing data accessed in step 610 may be five-minute nodal pricing for a particular node 130 for a particular 24-hour period as illustrated above in TABLE 1.

At step 620, method 600 determines maximum charge and minimum discharge prices for the previous N days. For example, TABLE 2 below illustrates the twelve five-minute periods in which battery 140 was discharged over the past two days, with the minimum discharge price for each day being underlined for emphasis:

TABLE 2

| | 1 Day Prior | | 2 Days Prior |
| --- | --- | --- | --- |
| TIME | PRICE/MWh | TIME | PRICE/MWh |
| 6:00:00 | $1208.95 | 6:05:00 | $1208.90 |
| 7:10:00 | $1208.28 | 6:10:00 | $1208.92 |

TABLE 2-continued

| | 1 Day Prior | | 2 Days Prior |
| --- | --- | --- | --- |
| TIME | PRICE/MWh | TIME | PRICE/MWh |
| 7:15:00 | $1202.30 | 8:15:00 | $1209.30 |
| 9:15:00 | $1208.33 | 8:25:00 | $1208.30 |
| 10:20:00 | $1208.63 | 10:25:00 | $1204.71 |
| 10:25:00 | $1208.74 | 10:30:00 | $1208.77 |
| 10:30:00 | $1228.73 | 10:35:00 | $1218.73 |
| 10:35:00 | $1228.8 | 10:40:00 | $1218.80 |
| 10:55:00 | $1218.46 | 11:55:00 | $1228.46 |
| 11:00:00 | $1238.65 | 12:00:00 | $1228.65 |
| 12:05:00 | $1218.79 | 12:05:00 | $1228.79 |
| 13:10:00 | $1208.68 | 12:10:00 | $1238.68 |

Similarly, TABLE 3 below illustrates the twelve five-minute periods in which battery 140 was charged over the past two days:

TABLE 2

| | 1 Day Prior | | 2 Days Prior |
| --- | --- | --- | --- |
| TIME | PRICE/MWh | TIME | PRICE/MWh |
| 1:00:00 | $12.95 | 2:05:00 | $12.90 |
| 1:10:00 | $12.28 | 2:15:00 | $12.92 |
| 1:15:00 | $12.30 | 2:30:00 | $12.30 |
| 2:15:00 | $12.33 | 3:15:00 | $12.30 |
| 2:20:00 | $20.63 | 4:25:00 | $12.71 |
| 2:25:00 | $20.74 | 4:35:00 | $12.77 |
| 2:30:00 | $22.73 | 4:40:00 | $21.73 |
| 2:35:00 | $22.80 | 4:50:00 | $21.80 |
| 2:55:00 | $21.46 | 4:55:00 | $25.46 |
| 3:00:00 | $25.65 | 5:00:00 | $22.65 |
| 3:05:00 | $21.79 | 5:05:00 | $22.79 |
| 3:10:00 | $20.68 | 5:10:00 | $23.68 |

In this example, the maximum charge price over the previous two days as determined in step 620 was $25.65 (which occurred one day prior at 3:00) and the minimum discharge price was $1204.71 (which occurred two days prior at 10:25). In some embodiments, the maximum charge price is set in step 620 to the highest maximum charge price over the previous N days (i.e., $25.65 in this example) and the minimum discharge price is set in step 620 to the lowest minimum discharge price over the previous N days (i.e., $1204.71 in this example). In other embodiments, the maximum charge price is set in step 620 to the average of the maximum charge prices over the previous N days (i.e., ($25.65+$25.46)/2=$25.56 in this example) and the minimum discharge price is set in step 620 to the average of the minimum discharge prices over the previous N days (i.e., ($1204.71+$1202.30)/2=$1203.51 in this example). In some embodiments, step 620 includes choosing the maximum charge price/minimum discharge price combination that gives the optimal charge price and optimal discharge price. In these embodiments, a matrix of possible maximum charge/minimum discharge prices is created and tested against the historical five-minute pricing data for the previous N days of step 610. In some embodiments, the combination that gives the highest net revenue is selected as the optimal charge price and optimal discharge price combination.

At step 630, method 600 accesses live five-minute pricing data for the current day. In some embodiments, the live five-minute pricing data is electricity pricing data that is provided by a manager of an electricity grid. For example, ERCOT publishes in real time the electricity price per MWh for the upcoming next five-minute time period of the day.

At step 640, method 600 compares the live five-minute pricing data of step 630 with the optimal minimum discharge price determined in step 620. If the next live five-minute electricity price is greater than or equal to the optimal minimum discharge price determined in step 620 and the amount of current charge of battery 140 is greater than zero (i.e., there is at least some charge remaining in battery 140), method 600 moves to step 650 where instructions are sent to discharge battery 140 during the next five-minute time period. If the next live five-minute electricity price (i.e., the next upcoming live five-minute electricity price) is not greater than or equal to the optimal minimum discharge price determined in step 620 or the amount of current charge of battery 140 is not greater than zero, method 600 moves to step 660.

In some embodiments, step 640 analyzes predictive conditions in addition to the minimum discharge price determined in step 620 and the amount of current charge of battery 140. For example, method 600 may move to step 650 only when the following three conditions are met: 1) the next live five-minute electricity price is greater than or equal to the optimal minimum discharge price determined in step 620, 2) the amount of current charge of battery 140 is greater than zero, and 3) one or more predictive conditions are met. Similarly, method 600 may move to step 660 if any of the above three conditions are not met. In some embodiments, the predictive conditions include utilizing a classification method and/or a price forecast method. The classification method may define future time periods as one of a predefined category (e.g., high, medium, or low price) based on historical market conditions and forecasted conditions. The price forecast method may be based on the relationships between historical data and historical price, with forecasted market data input and future price output. Example predictive models and algorithms that may be utilized by step 640 are discussed in more detail below.

In some embodiments, XGBoost (also known as extreme gradient boosting) may be utilized in step 640. XGBoost is a machine learning algorithm which falls under the category of distributed and ensemble machine learning. This algorithm is useful because of its high speed and high model efficiency. XGBoost supports parallelization by creating decision trees and converts weak learners to strong learners by adjusting the weight of weak-learners which reduces the bias from the model and improves accuracy.

In some embodiments, a classification predictive model may be utilized in step 640. In general, classification predictive modeling is the process of approximating a mapping function (f) from input variables (X) to discrete output variables (y). This is a supervised learning model where the data is labeled with the correct classes. In some embodiments, this model classifies and groups the data into three categories: high, medium and low (1, 0, -1) making it a multi-class classification predictive model. A high output value indicates that the next 15-minute value is in a high zone, which is, for example, 10% of the highest historical price values. A medium output value represents that the next 15-minute value is in a medium zone, which is, for example, 80% of the medium historical price values. A low output value represents that the next 15-minute value is in a low zone, which is, for example, 10% of the lowest historical price values.

In some embodiments, a regression predictive model may be utilized in step 640. In general, regression predictive modeling is the process of approximating a mapping function (f) from input variables (X) to continuous output variables (y). This is a supervised learning model where the input is the true historical electricity prices along with other variables and the output is a continuous value which represents the predicted price of the electricity in 15-minute interval. The predicted output values from the regression algorithm provides the magnitude of the prices which are expected in the next 24-hour period.

At step 660, method 600 compares the live five-minute pricing data of step 630 with the optimal maximum charge price determined in step 620. If the next live five-minute electricity price is less than or equal to the optimal maximum charge price determined in step 620 and the amount of current charge of battery 140 is less than the maximum charge amount (i.e., there is at least some charge space remaining in battery 140), method 600 moves to step 670 where instructions are sent to charge battery 140 during the next five-minute time period. If the next live five-minute electricity price is not less than or equal to the optimal maximum charge price determined in step 620 or the amount of current charge of battery 140 is not less than the maximum charge amount, method 600 moves to step 680 where no charging or discharging is performed on battery 140. After step 680, method 600 may proceed back to step 640. At step 685, method 600 determines if battery 140 has been completely discharged (e.g., a 1 MW battery 140 has already been discharged over twelve five-minute time periods). If so, method 600 may end. Otherwise, method 600 may proceed to step 640.

In some embodiments, method 600 may analyze one or more customer constraints in steps 640 and 660 before deciding to charge or discharge battery 140 in steps 650 and 670. For example, some customers may place a constraint that their battery may not be discharged to the grid during certain portions of the day (e.g., battery 140 may not be discharged between the hours of 8 AM-10 PM). As another example, some customers may place a constraint that their battery may not be discharged below a certain percentage (e.g., battery 140 may not be ever be discharged below 20% of capacity). As yet another example, some customers may place certain charge/discharge price constraints on their battery (e.g., battery 140 may not be ever be discharged below a certain price or charged above a certain price). Method 600 may analyze such customer constraints to ensure that battery 140 is not charged or discharged in violation of any such constraints.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining an optimal price to charge/discharge battery 140 based on a comparison of live five-minute pricing data with a matrix of maximum charge and minimum discharge price combinations for the previous N days including the particular steps of the method of FIG. 6, this disclosure contemplates any suitable method for determining an optimal price to charge/discharge battery 140 based on a comparison of live five-minute pricing data with a matrix of maximum charge and minimum discharge price combinations for the previous N days including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6, including computer system 800 described below.

Figure 7:
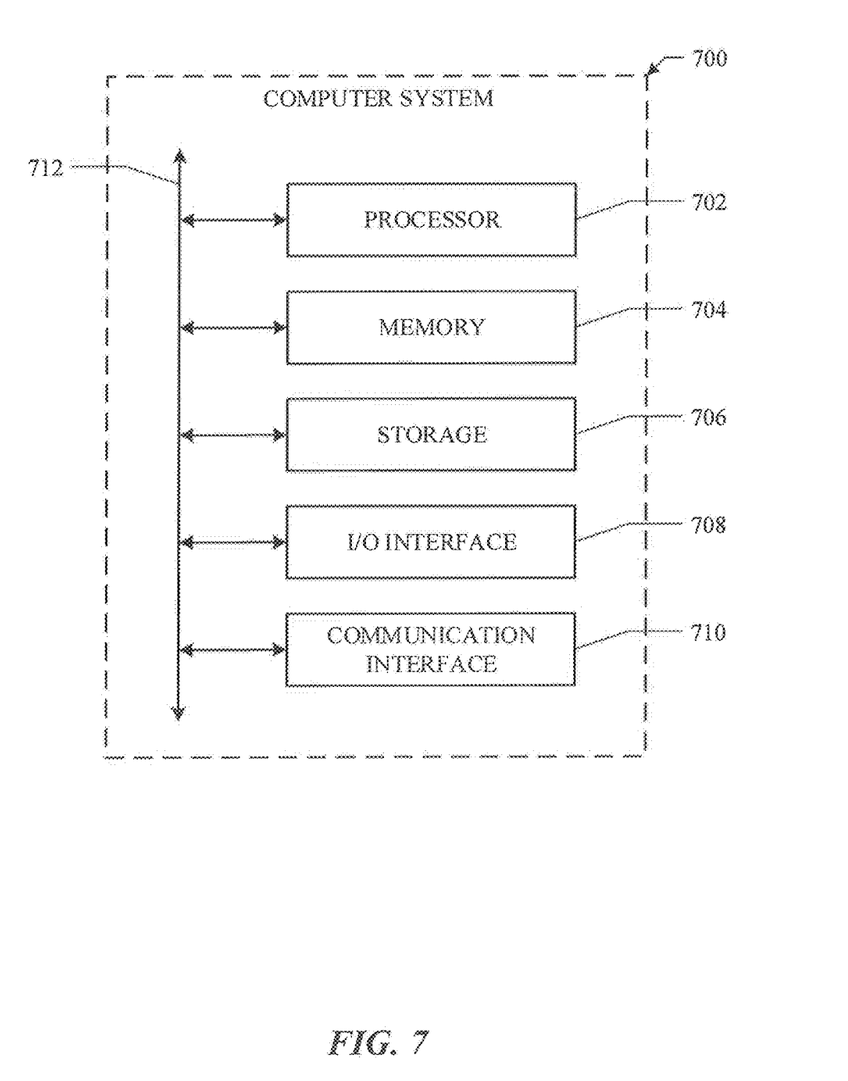
FIG. 7 illustrates an example computer system, according to some embodiments.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate. In some embodiments, computer system 700 may be integrated with battery 140. In other embodiments, computer system 700 is separate from battery 140. In some embodiments, one computer system 700 is integrated with battery 140 and communicates with another computer system 700 via one or more computer/communications networks.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
    a battery;
    one or more processors; and
    one or more computer-readable non-transitory storage media coupled to one or more of the processors and comprising instructions operable when executed by one or more of the processors to cause the system to:
    access historic five-minute electricity data for a predetermined number of previous days;
    determine, using the historic five-minute electricity data for the predetermined number of previous days, a matrix of maximum charge price and minimum discharge price combinations for the predetermined number of previous days, the matrix including a respective set number of maximum charge prices and minimum discharge prices for each of the predetermined number of previous days, the set number determined by a number of five-minute periods for the battery to be completely discharged;
    determine, using the matrix of maximum charge price and minimum discharge price combinations for the predetermined number of previous days, a maximum charge price for the predetermined number of previous days;
    determine, using the matrix of maximum charge price and minimum discharge price combinations for the predetermined number of previous days, a minimum discharge price for the predetermined number of previous days;
    determine a current amount of charge of the battery;
    access live five-minute electricity data for a current day;
    electronically communicate to the battery, across a communications network, one or more first instructions to discharge the battery during a next five-minute period when it is determined that: (i) an upcoming next live five-minute electricity price is greater than the determined minimum discharge price, (ii) the current amount of charge of the battery is greater than zero, and (iii) one or more predictive conditions are met; and
    electronically communicate to the battery, across the communications network, one or more second instructions to charge the battery during the next five-minute period when it is determined: that (i) the upcoming next live five-minute electricity price is less than the determined maximum charge price, (ii) the current amount of charge of the battery is less than a maximum charge amount of the battery, and (iii) one or more predictive conditions are met;
    wherein the battery is configured to:
    in response to electronically receiving the one or first instructions across the communications network, discharge during the next five-minute period; and
    in response to electronically receiving the one or second instructions across the communications network, charge during the next five-minute period.

2. The system of claim 1, wherein determining the maximum charge price for the predetermined number of previous days comprises determining a highest maximum charge price for the predetermined number of previous days.

3. The system of claim 1, wherein determining the minimum discharge price for the predetermined number of previous days comprises determining a lowest minimum discharge price for the predetermined number of previous days.

4. The system of claim 1, wherein determining the maximum charge price for the predetermined number of previous days comprises:
    determining a plurality of maximum prices for the predetermined number of previous days, wherein each maximum price of the plurality of maximum prices is a maximum price at which the battery was charged for a particular day of the predetermined number of previous days; and
    calculating an average of the plurality of maximum prices.

5. The system of claim 1, wherein determining the minimum discharge price for the predetermined number of previous days comprises:
    determining a plurality of minimum prices for the predetermined number of previous days, wherein each minimum price of the plurality of minimum prices is a minimum price at which the battery was discharged for a particular day of the predetermined number of previous days; and
    calculating an average of the plurality of minimum prices.

6. The system of claim 1, wherein communicating the or more first and second instructions to charge and discharge the battery are further based on one or more customer constraints.

7. A method comprising:
    by a computing device, accessing historic five-minute electricity data for a predetermined number of previous days;
    by the computing device, determine, using the historic five-minute electricity data for the predetermined number of previous days, a matrix of maximum charge price and minimum discharge price combinations for the predetermined number of previous days, the matrix including a respective set number of maximum charge prices and minimum discharge prices for each of the predetermined number of previous days, the set number determined by a number of five-minute periods for a battery to be completely discharged;
    by the computing device, determining, using the matrix of maximum charge price and minimum discharge price combinations for the predetermined number of previous days, a maximum charge price for the predetermined number of previous days;
    by the computing device, determining, using the matrix of maximum charge price and minimum discharge price combinations for the predetermined number of previous days, a minimum discharge price for the predetermined number of previous days;
    by the computing device, determining a current amount of charge of the battery;
    by the computing device, accessing live five-minute electricity data for a current day;
    by the computing device, electronically communicating to the battery, across a communications network, one or more first instructions to discharge the battery during a next five-minute period when it is determined that: (i) an upcoming next live five-minute electricity price is greater than the determined minimum discharge price, (ii) the current amount of charge of the battery is greater than zero, and (iii) one or more predictive conditions are met;

by the computing device, electronically communicating to the battery, across the communications network, one or more second instructions to charge the battery during the next five-minute period when it is determined that: (i) the upcoming next live five-minute electricity price is less than the determined maximum charge price, (ii) the current amount of charge of the battery is less than a maximum charge amount of the battery, and (iii) one or more predictive conditions are met;

by the battery, discharging during the next five-minute period in response to electronically receiving the one or more first instructions; and by the battery, charging during the next five-minute period in response to electronically receiving the one or more second instructions.

8. The method of claim 7, wherein determining the maximum charge price for the predetermined number of previous days comprises determining a highest maximum charge price for the predetermined number of previous days.

9. The method of claim 7, wherein determining the minimum discharge price for the predetermined number of previous days comprises determining a lowest minimum discharge price for the predetermined number of previous days.

10. The method of claim 7, wherein determining the maximum charge price for the predetermined number of previous days comprises:
   determining a plurality of maximum prices for the predetermined number of previous days, wherein each maximum price of the plurality of maximum prices is a maximum price at which the battery was charged for a particular day of the predetermined number of previous days; and
   calculating an average of the plurality of maximum prices.

11. The method of claim 7, wherein determining the minimum discharge price for the predetermined number of previous days comprises:
   determining a plurality of minimum prices for the predetermined number of previous days, wherein each minimum price of the plurality of minimum prices is a minimum price at which the battery was discharged for a particular day of the predetermined number of previous days; and
   calculating an average of the plurality of minimum prices.

12. The method of claim 7, wherein electronically communicating the one or more first and second instructions to charge and discharge the battery are further based on one or more customer constraints.

13. One or more computer-readable non-transitory storage media embodying software that is operable when executed to:
   access historic five-minute electricity data for a predetermined number of previous days;
   determine, using the historic five-minute electricity data for the predetermined number of previous days, a matrix of maximum charge price and minimum discharge price combinations for the predetermined number of previous days, the matrix including a respective set number of maximum charge prices and minimum discharge prices for each of the predetermined number of previous days, the set number determined by a number of five-minute periods for a battery to be completely discharged;
   determine, using the matrix of maximum charge price and minimum discharge price combinations for the predetermined number of previous days, a maximum charge price for the predetermined number of previous days;
   determine, using the matrix of maximum charge price and minimum discharge price combinations for the predetermined number of previous days, a minimum discharge price for the predetermined number of previous days;
   determine a current amount of charge of the battery;
   access live five-minute electricity data for a current day;
   electronically communicate to the battery, across a communications network, one or more first instructions to discharge the battery during a next five-minute period when it is determined that: (i) an upcoming next live five-minute electricity price is greater than the determined minimum discharge price, (ii) the current amount of charge of the battery is greater than zero, and (iii) one or more predictive conditions are met; and
   electronically communicate to the battery, across the communications network, one or more second instructions to charge the battery during the next five-minute period when it is determined that: (i) the upcoming next live five-minute electricity price is less than the determined maximum charge price, (ii) the current amount of charge of the battery is less than a maximum charge amount of the battery, and (iii) one or more predictive conditions are met;
   discharge the battery during the next five-minute period in response to electronically receiving the one or more first instructions; and
   charge the battery during the next five-minute period in response to electronically receiving the one or more second instructions.

14. The one or more computer-readable non-transitory storage media of claim 13, wherein determining the maximum charge price for the predetermined number of previous days comprises determining a highest maximum charge price for the predetermined number of previous days.

15. The one or more computer-readable non-transitory storage media of claim 13, wherein determining the minimum discharge price for the predetermined number of previous days comprises determining a lowest minimum discharge price for the predetermined number of previous days.

16. The one or more computer-readable non-transitory storage media claim 13, wherein determining the maximum charge price for the predetermined number of previous days comprises:
   determining a plurality of maximum prices for the predetermined number of previous days, wherein each maximum price of the plurality of maximum prices is a maximum price at which the battery was charged for a particular day of the predetermined number of previous days; and
   calculating an average of the plurality of maximum prices.

17. The one or more computer-readable non-transitory storage media claim 13, wherein determining the minimum discharge price for the predetermined number of previous days comprises:
   determining a plurality of minimum prices for the predetermined number of previous days, wherein each minimum price of the plurality of minimum prices is a minimum price at which the battery was discharged for a particular day of the predetermined number of previous days; and calculating an average of the plurality of minimum prices.

18. The system of claim 1, wherein determining if the one or more predictive conditions are met comprises utilizing classification predictive modeling that defines future time periods as one of a plurality of defined categories based on historical market conditions and forecasted conditions.

19. The system of claim 1, wherein determining if the one or more predictive conditions are met comprises utilizing a regression predictive model to forecast expected prices.

* * * * *